United States Patent [19]

Jonsson

[11] 4,366,727

[45] Jan. 4, 1983

[54] PLANETARY-TYPE OF GEAR AND PROCEDURE AND APPARATUS FOR ITS PRODUCTION

[75] Inventor: Sven Jonsson, Storebro, Sweden

[73] Assignee: Vena Mekan Aktiebolag, Hultsfred, Sweden

[21] Appl. No.: 80,305

[22] Filed: Oct. 1, 1979

[30] Foreign Application Priority Data

Oct. 2, 1978 [SE] Sweden .............................. 7810288

[51] Int. Cl.³ ............................................. F16H 1/28
[52] U.S. Cl. .................................................. 74/801
[58] Field of Search .............................. 74/785, 801

[56] References Cited

U.S. PATENT DOCUMENTS

| | | | |
|---|---|---|---|
| 507,695 | 10/1893 | Thomson | 74/801 |
| 1,430,799 | 10/1922 | Davis | 74/785 |
| 1,799,740 | 4/1931 | Felton | 74/801 |
| 2,093,325 | 9/1937 | Lansing | 74/801 |
| 2,137,778 | 11/1938 | McCullough | 74/785 X |
| 4,043,226 | 8/1977 | Buuck | 74/801 |

FOREIGN PATENT DOCUMENTS

| | | | |
|---|---|---|---|
| 5353 | 12/1931 | Australia | 74/785 |
| 32749 | 1/1924 | Denmark . | |
| 973022 | 9/1950 | France | 74/801 |
| 664297 | 1/1952 | United Kingdom | 74/801 |
| 1384732 | 2/1975 | United Kingdom . | |
| 1488787 | 10/1977 | United Kingdom . | |

OTHER PUBLICATIONS

Fairfield brochure page.

*Primary Examiner*—Allan D. Herrmann
*Attorney, Agent, or Firm*—Fleit & Jacobson

[57] ABSTRACT

The present invention concerns a gear mechanism of the planetary type, a procedure for manufacturing a component of the gear mechanism, and an apparatus for manufacturing the gear component. The gear mechanism, which has one incoming and one outgoing shaft, is characterized by two or more planetary gear wheels, each being equipped with two mutually, firmly connected gear wheels with different diametrical pitches. One of the gear wheels is in mesh with, on one hand, a sun wheel, fitted on the incoming shaft, and, on the other hand, with a gear ring, firmly connected to a housing surrounding the gear mechanism. The other gear wheel on each planetary gear wheel is in mesh with a gear wheel, preferentially a gear ring, firmly connected to the outgoing shaft. The purpose of the procedure and the apparatus is to manufacture the planetary gear wheels so that they, to the extent it is possible, become identical with respect to shape and mutual placing of the two gear wheels, with the exception of a possible changed peripheral displacement between the wheels and that the planetary gear wheels are inserted with correct phase in the gear mechanism.

7 Claims, 5 Drawing Figures

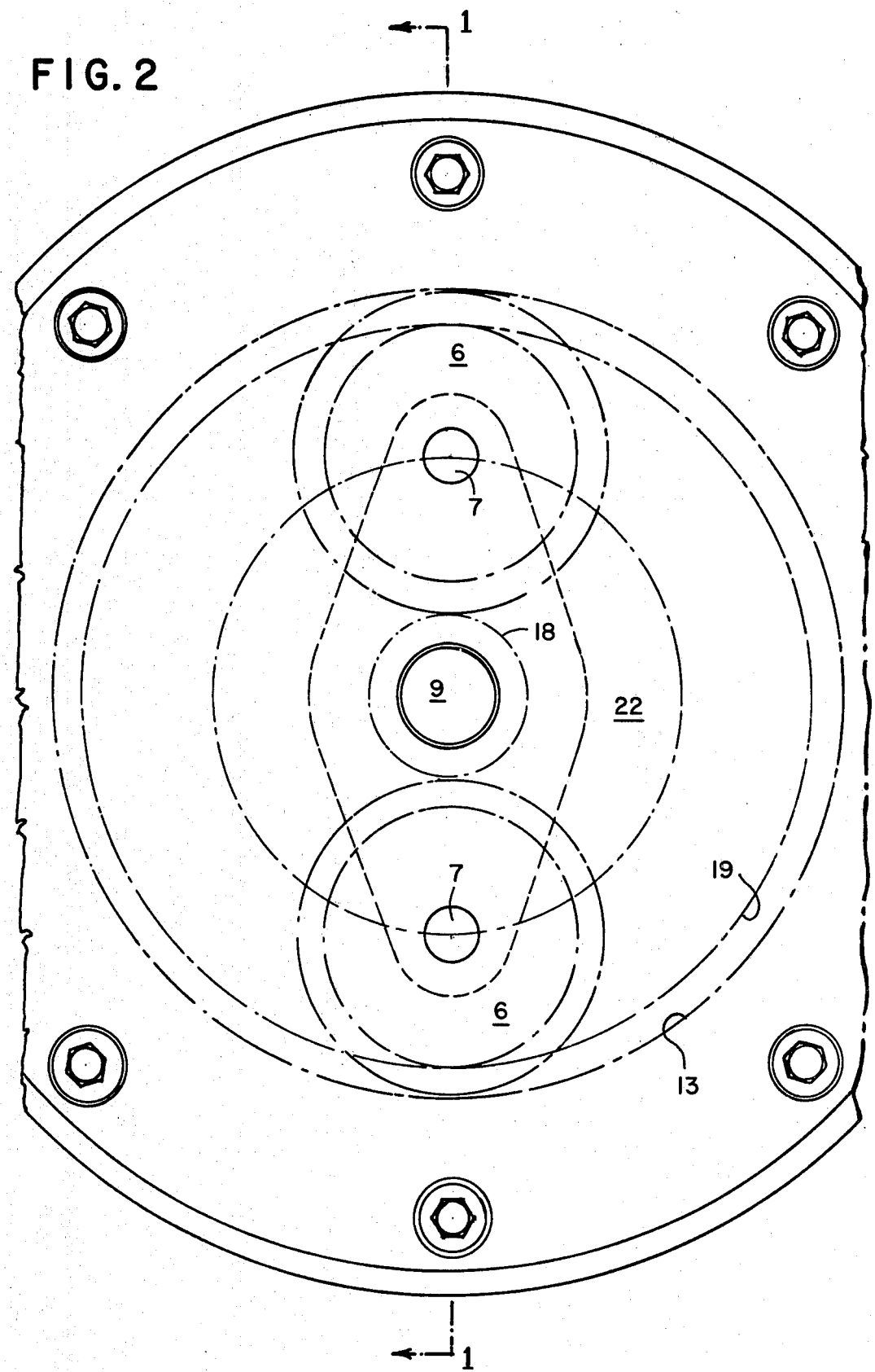

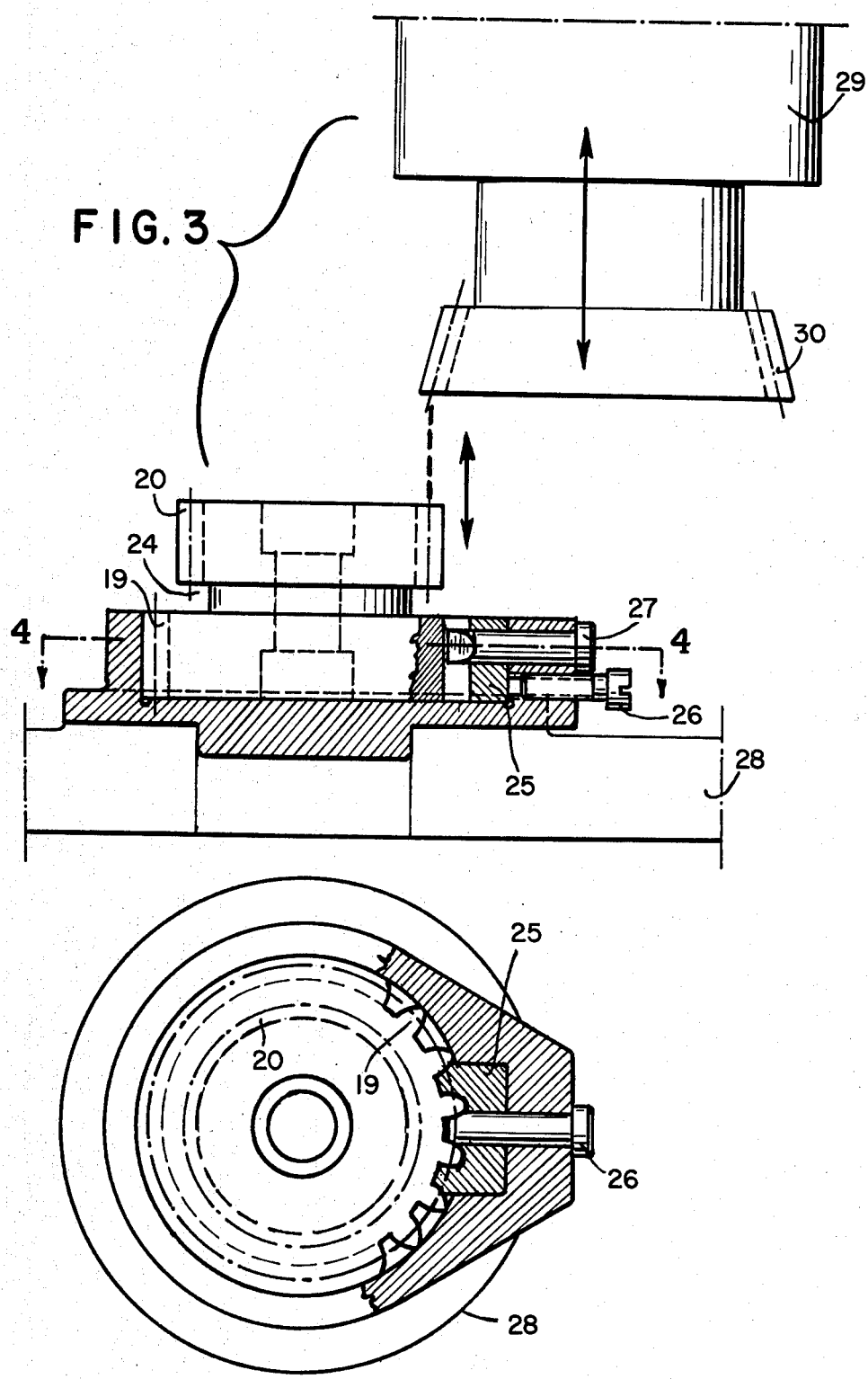

PLANETARY-TYPE OF GEAR AND PROCEDURE AND APPARATUS FOR ITS PRODUCTION

BACKGROUND OF THE INVENTION

1. Field of the Invention

The present invention concerns, in the first place, a gear working as a gear mechanism between an incoming and an outgoing shaft for the change of r.p.m. The gear mechanism according to the invention is especially suited for usage when a large reduction of r.p.m. is to be achieved, but the principal can be applied also to other gear ratios. The invention also concerns a procedure and apparatus for producing the gear mechanism.

2. Description of the Prior Art

It has been believed as early as 1924 that a gear mechanism could be engineered having planetary gears containing several planetary wheels circling around a sun wheel. The planetary gears support a first gear wheel with a different diametrical pitch than the one that is in mesh with the sun wheel, and an outside gear ring joined with the cover. The planetary gears also support a second gear wheel that is in mesh with a gear ring belonging to the outgoing shaft. In this way, it was believed that a large reduction of the r.p.m. of an incoming shaft could be obtained. Danish Pat. No. 32749 shows a couple of such solutions in principle.

Unfortunately, the Danish patent does not take into account the absolute necessary condition of a careful matching of the phase displacements between the two mutually firmly connected wheels existing on the planetary wheel, without which the gear completely locks or runs with intense wear, etc. Further, it is absolutely necessarily required for a good function that the center of the planet be built steady and carefully centered on main shafts carried in bearings, since otherwise the meshing will vary in an uncontrollable way due to the fact that principally the dead weight of the planetary center will effect the gear. This causes, in turn, an uneven operation and fast wear of the gear teeth in the gear.

SUMMARY OF THE INVENTION

The gear mechanism according to the present invention contains a relatively small number of parts, which are a part of a very compact and well enclosed construction, which suitably is connected with an incoming shaft directly coupled to a motor, for instance, an electrical motor, whereby the incoming shaft to the gear and the motor shaft can constitute one and the same part.

Further, the invention concerns a procedure and an apparatus for the production of a component of the gear or gear mechanism according to the invention. Since each of the planetary wheels or gear wheels during its rotation is in mesh with three gear wheels or paths, they must be formed in a special way so that they will not lock. Through the possibility of arranging a number of planetary wheels evenly spaced around the circumference, the transmitted power will to a large extent be increased without the outside dimensions thereby being changed and without any considerable increase in weight or manufacturing cost. This must be considered a major advantage. Furthermore, a very good balancing is acquired.

The detailed nature of the gear, procedure, and apparatus for production according to the present invention is clear from the attached claims.

BRIEF DESCRIPTION OF THE DRAWINGS

In the detailed description of the preferred embodiments of the invention hereinafter presented, reference is made to the accompanying drawings, in which:

FIG. 2 is a schematic end view of the inlet of the gear mechanism illustrated in FIG. 1;

FIG. 3 is a schematic front elevation, partially in section, of an apparatus for producing a planetary gear wheel of the gear mechanism in FIG. 1; and FIG. 4 is a schematic, partial sectional view along line 4—4 of FIG. 3.

FIG. 5 is a view similar to FIG. 1 of a second embodiment of a gear mechanism according to the present invention.

DESCRIPTION OF THE PREFERRED EMBODIMENTS

Figure 1:
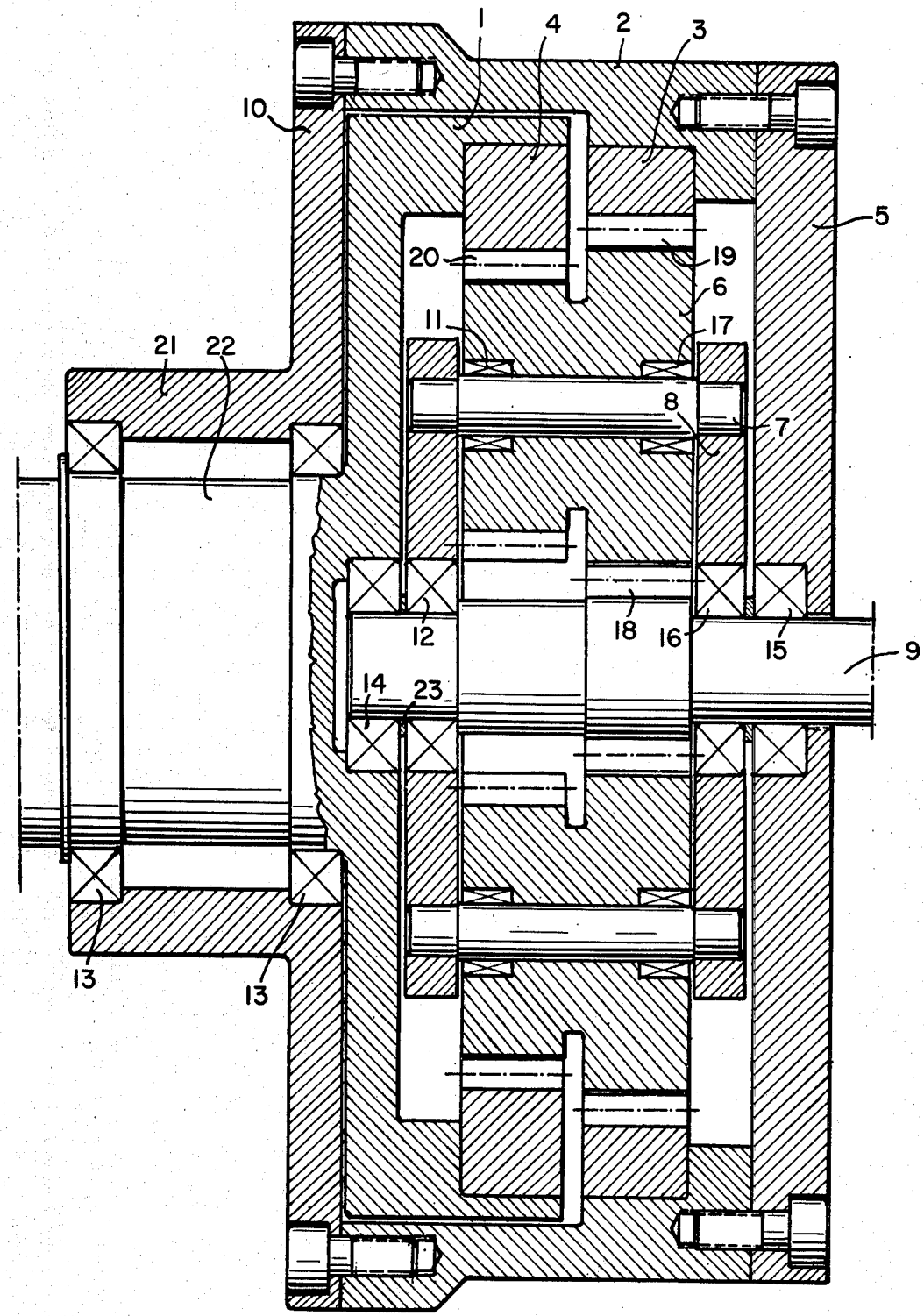
FIG. 1 is a schematic cross section taken on line 1—1 of FIG. 2 of one embodiment of a gear mechanism according to the present invention.

Because gear mechanisms and procedures and apparatus for their manufacture are well known, the present description will be directed in particular to elements forming part of, or cooperating more directly with, the present invention. Elements not specifically shown or described herein are understood to be selectable from those known in the art.

Referring now to the drawings, and to FIGS. 1 and 2 in particular, a gear mechanism is illustrated having a stationary housing with a gear ring 3 attached thereto by means of a screw joint. An incoming shaft 9 of the gear mechanism is equipped with an exterior gear wheel 18. The shaft 9 is supported by a first set of bearings 15 positioned in one end 5 of the housing 2 and by a second set of bearings 14 supported by an output or outgoing shaft 22.

A planetary center is arranged in which the two planetary wheels or gear wheels 6 are mounted in bearings. Both of the planetary wheels have two gear wheel portions 19 and 20. Preferably, the wheels 6 are made from one piece of material, which has a central boring. A journal 7, equipped with needle bearings 11, 17, carries each of the planetary wheels 6. The first of the gear wheel portions 19 is in mesh with both the gear wheel 18 on the incoming shaft 9 and the gear ring 3 affixed to the housing. The second gear wheel portion 20 has a diameter different from that of the first portion 19 and also possibly a different number of teeth. Gear wheel 20 is in mesh with the gear wheel 4. which is firmly joined with the portion 1 of the composite outgoing shaft 1,22. The journals 7 are firmly joined with ring-shaped discs 8 on both sides of the planetary wheels, which discs also surround the incoming shaft 9 and are carried on shaft 9 by means of bearings 12 and 16. Between the adjacent bearings 14 and 12 is a distance or adjusting piece 23. As can be seen, the outgoing shaft has an enlarged diameter part 1, which carries the gear ring 4. The housing 2 has a reduced diameter part 21, which surrounds the end of the part 22 of the composite outgoing shaft.

The composite outgoing shaft 1,22 is equipped with the gear ring 4, and is supported at the other end 10 of the housing 2 by means of two bearings 13.

It is often desirable to be able to calculate the gear ratio of a gear mechanism knowing the dimensions of those gear wheels that are a part of the gear.

In the following equations:
the r.p.m. of the incoming shaft equals $N_A$
the r.p.m. of the outgoing shaft equals $N_B$
the diametrical pitch of the gear wheel or drive of the incoming shaft equals $D_A$
the diametrical pitch of the gear ring of the outgoing shaft equals $D_B$
the diametrical pitch of the gear ring mounted on the housing equals $D_H$
the diametrical pitch of the first planetary gear wheels equals $D_{P1}$
the diametrical pitch of the second planetary gear wheel in mesh with the gear ring of the outgoing shaft equals $D_{P2}$)
and the gear ratio is obtained according to the formula $$N_B/N_A = \frac{(D_{P1} - D_{P2}) \cdot D_A}{2 D_{P1} \cdot D_B}$$

If, which usually is the case, all gear paths in the gear have the same modulus, the diametrical pitches can be interchanged with the corresponding gear tooth number since these quantities are proportional to each other.

In the here described embodiment, all gear paths are assumed having the same modulus. If it is assumed that the sun wheel 18 on the incoming shaft 9 has a gear tooth number of 13, the gear ring 3 on the housing has a gear tooth number of 43, the gear ring on the outgoing shaft has a gear tooth number of 42, and the gear tooth numbers of gear wheels 19 and 20 of the planetary wheels 6 amount to 15 and 14, respectively, a gear ratio of close to 1:97 is obtained. Thus, the gear mechanism provides a large reduction of the r.p.m. of the incoming shaft.

The planetary wheels in the described embodiment are made from one single piece of material. It is an indispensable condition when two planetary wheels are a part of the same gear that the wheels be made so that the two gear wheels are mutually identically orientated and otherwise made as identical as possible, so that the gear will not lock or wear in an unnatural way. Moreover, the planetary wheels have to be placed in correct phase in relation to each other, when these are to be arranged evenly spaced around the circumference of the sun wheel.

An example of how an apparatus or machine set, in which a number of mutually matching planetary wheels, which can be used in a gear according to the present invention, can be made is schematically shown in FIG. 3. The apparatus is used to work the gear teeth in the second gear wheel 20 on the planetary wheels to make this gear wheel match the first wheel 19.

The gear-cutting on the second wheel 20 will now be described. A fixture 25 is fastened in a usual way on a machine table 28, so that it is steadily fixed. The fixture 25 has a turned position for the wheel 19, which is readily furnished with teeth. Then, the planetary wheel 6 is secured by means of a screw 26 and is fastened in a usual way so that a wedge 27 will enter a tooth space. Then, the other gear wheel portion 20, which is separated from the first by a slit 24, is planed. This gear wheel will consequently be positioned in a certain relation to the tooth space receiving the wedge 27. Under the assumption that the gear box of the machine, the cutter wheel 30 or the spindle 29 of the planing-machine are not subject to any change, all the planetary wheels that are run this way will be identical, as regards the placing of the two gear wheel portions in relation to the tooth receiving the wedge.

It is, of course, possible to let any one of the main shafts of the gear be the incoming shaft. Further, one can change the gear shown in FIGS. 1 and 2 in such a way that the gear ring 4 is turned into a gear ring or a gear wheel with outward teeth and internal teeth that mesh with the gear wheel 20. Then, one naturally obtains another gear ratio. This embodiment is specifically illustrated in FIG. 5. In this figure, the same reference numerals, with primes attached, have been used to identify components similar to those previously described. As illustrated in FIG. 5, a gear wheel 20' drives a gear ring 4' carried by shaft 1'. Furthermore, there is the possibility of furnishing the planetary wheels with more than two gear wheels or paths, whereby several outgoing shafts can be obtained, which can be carried in bearings concentrically to each other. Such devices can be of use in special cases.

Previously, specific embodiments of the present invention have been described. It should be appreciated, however, that these embodiments have been described for the purposes of illustration only, without any intention of limiting the scope of the present invention. Rather, it is the intention that the present invention be limited only by the appended claims.

What is claimed is:

1. A gear having a housing (2, 5, 10, 21), an input main shaft (9) and an output mean shaft (1, 22), which main shafts are coaxially mounted in the housing with respect to each other, a toothed path (18) fixedly connected with and coaxial with said input main shaft and having a diametrical pitch ($D_A$), a toothed path (4) fixedly connected with and coaxial with said output main shaft and having a diametrical pitch ($D_B$), said housing having a toothed path (3) in the form of a gear ring with internal teeth which is fixedly connected to the housing and coaxial with said main shafts and has a diametrical pitch ($D_H$), and there being mounted on one (9) of said main shafts a sun wheel which carries the toothed path (18) of said input main shaft and around the circumference of which two or more planet wheels (6) are evenly distributed, which have a first toothed path (19) having a diametrical pitch ($D_{P1}$) which meshes with the toothed path (18) of said input main shaft (9) and with the toothed path (3) of the housing, and a second toothed path (20) having a diametrical pitch ($D_{P2}$) coaxial with said first toothed path (19) and axially offset with respect thereto and having a different pitch diameter and a different number of gear teeth than said first toothed path, said second toothed path (20) being integral with said first toothed path and meshing with the toothed path (4) of the output main shaft, both toothed paths (19, 20) of each planet wheel (6) having a predetermined peripheral angular offset with respect to each other, said angular offset being dependent both on the relative angles of the planet wheels (6) at the center of the gear, and on the number of teeth pitch diameters of all the toothed paths (3, 4, 18, 19, 20), the planet wheels (6) being placed in a predetermined rotational position with respect to each other in mesh with the toothed paths (4, 18) of the main shafts (9, 1, 22) and with the toothed path (3) of the housing (2, 5, 10, 21), the toothed path (18) of said input main shaft having a first number of gear teeth;

the second toothed path (20) of said planet wheels having a second number of gear teeth, the second number being larger than the first number;

the first toothed path (19) of said planet wheels having a third number of gear teeth, the third number being larger than the second number;

the toothed path (4) of the output main shaft having a fourth number of gear teeth, the fourth number being larger than the third number; and the toothed path (3) of the housing having a fifth number of gear teeth, the fifth number being larger than the fourth number, the relationship between said gear teeth being such that the gear provides a large reduction of the r.p.m. of said input main shaft, and being such that, the ratio of the r.p.m. of the input main shaft ($N_A$) to the r.p.m. of the output main shaft ($N_B$) is determined by the formula:

$$\frac{N_B}{N_A} = \frac{(D_{P1} - D_{P2}) D_A}{2 D_{P1} D_B}.$$

2. Gear according to claim 1, characterized in that the planet wheels (6) are mounted in a planetary center which consists of annular disks (8) disposed on either side of the planet wheels and coaxial with said main shafts, the main planes of said disks being perpendicular to the main shafts and the disks being fixedly connected to each other and mounted by means of bearings (12, 16) on said one main shaft (9).

3. Gear according to claim 2, characterized in that said disks (8) are fixedly connected to each other by means of shafts (7) carrying the planet wheels (6).

4. Gear according to one of claims 1, 2, or 3, characterized in that said two main shafts (9, 1, 22) are rotatably mounted both in each other and in the housing.

5. Gear according to one of claims 1, 2, or 3, characterized in that the toothed path (4) of said other main shaft (1, 22) is a gear ring with internal teeth.

6. Gear according to one of claims 1, 2, or 3, characterized in that at least some of the planet wheels (6) have a different angular offset between their two toothed paths (19, 20).

7. A gear having a housing (2, 5, 10, 21), an input main shaft (9) and an output main shaft (1, 22), which main shafts are coaxially mounted in the housing with respect to each other and fixedly connected each to a toothed path (18 and 4, respectively) coaxial with said main shafts, said housing having a toothed path (3) in the form of a gear ring with internal teeth which is fixedly connected to the housing and coaxial with said main shafts, and there being mounted on one (9) of said main shafts a sun wheel which carries the toothed path (18) of said one main shaft and around the circumference of which two or more planet wheels (6) are evenly distributed, which have a first toothed path (19) which meshes with the toothed path (18) of said one main shaft (9) and with the toothed path (3) of the housing, and a second toothed path (20) coaxial with said first toothed path (19) and axially offset with respect thereto and having a different pitch diameter and a different number of gear teeth than said first toothed path, said second toothed path (20) being integral with said first toothed path and meshing with the toothed path (4) of the other (1, 22) of said main shafts, characterized in that both toothed paths (19, 20) of each planet wheel (6) have a predetermined peripheral angular offset with respect to each other, said angular offset being dependent both on the relative angles of the planet wheels (6) at the center of the gear, and on the number of teeth pitch diameters of all the toothed paths (3, 4, 18, 19, 20), in that the planet wheels (6) are placed in a predetermined rotational position with respect to each other in mesh with the toothed paths (4, 18) of the main shafts (9, 1, 22) and with the toothed path (3) of the housing (2, 5, 10, 21); and in that the toothed path (4) of said other main shaft (1, 22) is a toothed wheel with external teeth.

* * * * *